Figure 1:
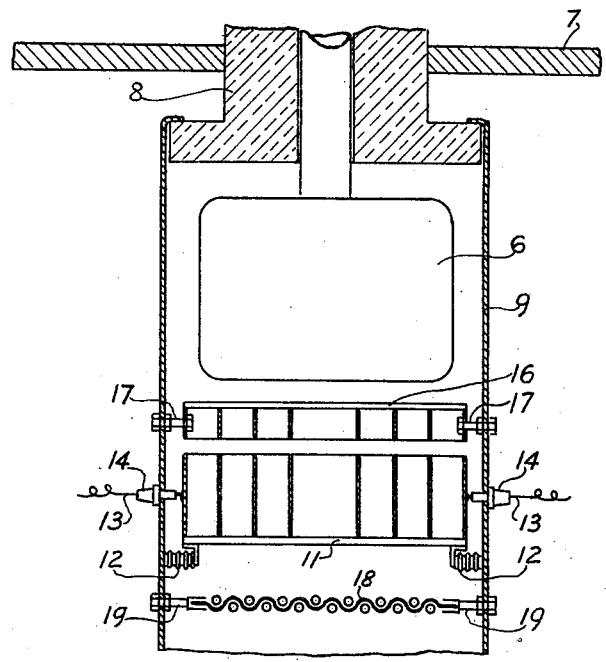

May 16, 1933.  W. BOVERI ET AL  1,908,949

ELECTRIC RECTIFIER CONTROL GRID

Filed May 16, 1931

Inventors
Willi Boveri
Armin Leuthold
By [signature]
Attorney.

Patented May 16, 1933

1,908,949

UNITED STATES PATENT OFFICE

WILLI BOVERI, OF ZURICH, AND ARMIN LEUTHOLD, OF BADEN, SWITZERLAND, ASSIGNORS TO AKTIENGESELLSCHAFT BROWN BOVERI & CIE., OF BADEN, SWITZERLAND, A JOINT STOCK COMPANY OF SWITZERLAND

ELECTRIC RECTIFIER CONTROL GRID

Application filed May 16, 1931, Serial No. 537,832, and in Germany May 26, 1930.

This invention relates to improvements in grid arrangements for the anodes of electric power rectifiers of the metallic vapor arc type in which the grids are utilized to control the operation of the rectifier by controlling the time of attachment of the arc on the anodes.

Constructions in the form of screens, sieves, sleeves or the like have heretofore been inserted in the tank portion surrounding the anodes or in the arc guides arranged about the anodes of electric power rectifiers. Such constructions were arranged in either insulated or uninsulated relation with the surrounding tank portion or arc guides and frequently had a negative potential impressed thereon to make the arc controllable by controlling the time of attachment of the arc on the anodes. The negative potential increases the voltage required for the ignition of the arc on the controlled anode so that its ignition is delayed and re-ignition, and therefore backfiring, of the anode is prevented. The same result may likewise be attained by the aid of grids which do not have a negative potential impressed thereon if the grids are so arranged adjacent the anodes that they are surrounded on all sides by the arc flowing from the anodes. Such arrangement of uncontrolled grids permits the extraction thereby of heat from the arc or the grids may be heated from an exterior source. Such heating causes the surrounding metallic vapor to be superheated thereby decreasing the vapor density, prevents the access of unvapoized cathode material to the anodes and also prevents the condensation of residual gases on the anodes. Backfires due to the formation of cathode spots on the anodes are thus prevented.

Constructions have also been proposed in which both controlled and uncontrolled grids, i. e. grids having and not having a negative potential impressed thereon, are arranged over each other across the longitudinal axis of the arc guides. Research has shown however that all of the above grid arrangements are not sufficient to control the arc in many cases. Such failure is due to the fact that the negatively charged grid itself emits charge carriers from its surface into a layer of ions formed thereabout. A wandering of the charge carriers from the grid to the anode thus takes place even though the grid openings may be made small enough so that they are completely filled by the layer of ions. In the use of grids with such small openings, however, great care must be taken that the openings are not so excessively restricted as to hinder the passage of the arc therethrough after the arc has been ignited. In addition to the above effect, surge ionizations due to the vapor density also occur in the space between the grids and the anodes, which ionizations cause automatic discharges so that the layer of ions about the grids is destroyed and a grid control of the arc is impossible.

It is, therefore, among the objects of the present invention to provide a grid structure to be enclosed within the tank portion of an electric power rectifier of the metallic vapor arc type immediately surrounding the anodes in which both the heating effect of uncontrolled grids and the repulsive effect of controlled grids are used to control the moment of attachment of the arc.

Another object of the invention is to provide a grid structure to be enclosed within the arc guides about the anodes of an electric power rectifier of the metallic vapor arc type in which a grid which is not supplied with a potential is arranged to extract heat from the arc to decrease the vapor density adjacent the anode and a grid having a potential supplied thereto is used to control the movement of the electric charge carriers.

Another object of the invention is to provide a grid structure to be enclosed within the arc guides about the anodes of an electric power rectifier of the metallic vapor arc type in which an uncontrolled grid is arranged between a controlled grid and the anodes.

Figure 2:
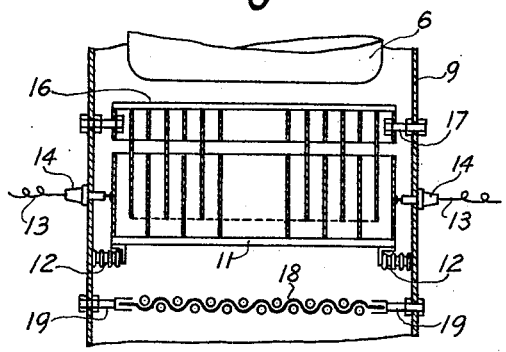

Objects and advantages, other than those above set forth, will be apparent from the following description when read in connection with the accompanying drawing in which Figure 1 illustrates one embodiment of the invention in vertical cross-section in which an uncontrolled grid is arranged between a controlled grid, within the arc guide, and an anode, and Fig. 2 is a fragmentary view similar to that shown in Fig. 1 but showing a modified form of the structure of the uncontrolled grid.

Referring more particularly to the drawing by characters of reference, the reference numeral 6 designates an anode extending through the cover 7 of a metallic rectifier tank (not shown) through an insulator 8. An arc guide 9, suspended from the insulator 8 and having an open lower end, partially encloses the anode 6 and extends toward a cathode (not shown) of vaporizable metal retained in the tank as is usual in electric power rectifier of the metallic vapor arc type.

A grid 11, here shown as being formed of short cylinders of current conductive material arranged in concentric space relation with the surfaces thereof parallel with the surfaces of the arc guide 9, is supported a short distance below the lowermost surfaces of the anode 6 on insulators 12. The grid 11 may also be made in the form of a screen or sieve arranged across the arc guide if desired. The grid is connected with a suitable source of control potential (not shown) by means of conductors 13 passing through bushings 14 in the arc guide 9. A grid 16, here shown as formed of short cylinders of heat resistive material arranged in concentric relation with the walls of the arc guide, is supported by suitable bolts 17 which may be insulated from the arc guide, between the controlled grid 11 and the lower surfaces of the anode 6. The grid 16 is not controlled i. e. is not connected with a source of potential. A screen or sieve may also be used in place of the concentric cylinders to form the uncontrolled grid 16 in which case the space between the controlled grid 11 and the anode 6 is very small which is advantageous.

The grid 16, being directly ahead of the anode in the direction of flow of the arc therefrom, is very highly heated by the arc and the space about the grid, and hence about the anode, is very highly overheated so that the metallic vapor density in such space is very low. To aid in the result produced by heating of the grid 16, the grid may also be heated by an external source of heat. The charge carriers emitted from the anode itself, or produced from the layer of ions about the grid or by the control grid 11 when the arc is not completely blocked thereby, are then entirely taken up by the uncontrolled grid 16. The occurrence of automatic discharges or surge ionizations between the controlled grid and the anode is thus avoided by the overheated uncontrolled grid in the space of the lowest vapor density and the lowest density of the charge carriers.

A second uncontrolled grid 18, formed as a screen, is supported, by suitable bolts as at 19, below the controlled grid 11. The grid 18 may be connected with an exterior source of heat and the two uncontrolled grids 16 and 18 may be conductively connected. The second uncontrolled grid 18 prevents the access of particles of unvaporized cathode material to the controlled grid 11 which might result in disturbances in the operation of the grid.

A modified form of the structure of the first uncontrolled grid 16 is shown in Fig. 2 in which the number of cylinders forming the uncontrolled grid is increased and alternate cylinders are extended between the cylinders forming the controlled grid 11.

The grid arrangement disclosed by the present invention also provides an important protection against backfiring during normal operation of the rectifier for the reason that the anodes are more readily controllable by the formation of a zone of low vapor density and low mass of charge carriers directly ahead of the lowermost surfaces of the anodes. A zone of the highest impenetrability is thus formed at the location at which automatic discharges usually cause the appearance of backfires. Such zone makes the occurrence of an automatic discharge or surge ionization impossible.

Although but two embodiments of the present invention have been illustrated and described, it will be apparent to those skilled in the art that various changes and modifications may be made therein without departing from the spirit of the invention or from the scope of the appended claims.

The invention claimed is:

1. Means for controlling the attachment of the arc to the anodes of an electric power rectifier of the metallic vapor arc type comprising a grid to be controlled by the supply of a potential thereto, and an uncontrolled grid, said grids being arranged in the path of the arc flowing from the anode, and the said uncontrolled grid being arranged between said anode and said to be controlled grid.

2. Means for controlling the attachment of the arc to the anodes of an electric power rectifier of the metallic vapor arc type, the anodes being partially enclosed by arc guides, the means comprising a grid to be controlled by the supply of a potential thereto, and an uncontrolled grid, said grids being arranged within the arc guides ahead of the anodes in the direction of flow of the arc therefrom.

3. Means for controlling the attachment of the arc to the anodes of an electric power rectifier of the metallic vapor arc type comprising a grid to be controlled by the supply of a potential thereto, and a plurality of uncontrolled grids, said grids being arranged in the path of the arc flowing from the anodes, one of the uncontrolled grids being arranged between the anode and said to be controlled grid.

4. Means for controlling the attachment of the arc to the anodes of an electric power rectifier of the metallic vapor arc type, the anodes being partially enclosed by arc guides, the means comprising a grid to be controlled by the supply of a potential thereto, insulating means supporting said to be controlled grid within the arc guide, and an uncontrolled grid, conductive means supporting said uncontrolled grid within the arc guide, said grids being arranged within the arc guide ahead of the anodes in the direction of flow of the arc therefrom.

5. Means for controlling the attachment of the arc to the anodes of an electric power rectifier of the metallic vapor arc type, the anodes being partially enclosed by arc guides, the means comprising a grid to be controlled by the supply of a potential thereto, and an uncontrolled grid, said grids being arranged within the arc guide ahead of the anode in the direction of flow of the arc therefrom, and the said to be controlled grid being arranged between said uncontrolled grid within the arc guide.

6. Means for controlling the attachment of the arc to the anodes of an electric power rectifier of the metallic vapor arc type, the anodes being partially enclosed by arc guides, the means comprising a grid to be controlled by the supply of a potential thereto, and an uncontrolled grid, said grids being arranged in the path of the arc flowing from the anode and being formed of spaced concentric cylinders extending parallel with the arc guides.

7. Means for controlling the attachment of the arc to the anodes of an electric power rectifier of the metallic vapor arc type, the anodes being partially enclosed by arc guides, the means comprising a grid to be controlled by the supply of a potential therto, and an uncontrolled grid, said grids being arranged in the path of the arc flowing from the anode and being formed of spaced concentric cylinders extending parallel with the arc guides, the cylinders of said grids being arranged in interleaved relation.

8. Means for controlling the attachment of the arc to the anodes of an electric power rectifier of the metallic vapor arc type, the anodes being partially enclosed by arc guides, means comprising a grid to be controlled by the supply of a potential thereto, and a plurality of uncontrolled grids, said grids being arranged in the path of the arc flowing from the anode, one of said uncontrolled grids being formed of spaced concentric cylinders extending parallel with the arc guide, and the other of said uncontrolled grids being formed as a screen extending across the arc guide.

In testimony whereof we have hereunto subscribed our names this 29th day of April A. D. 1931.

WILLI BOVERI.
ARMIN LEUTHOLD.

DISCLAIMER 1,908,949.—*Willi Boveri*, Zurich, and *Armin Leuthold*, Baden, Switzerland. ELECTRIC RECTIFIER CONTROL GRID. Patent dated May 16, 1933. Disclaimer filed September 30, 1939, by the assignee, *Aktiengesellschaft Brown Boveri & Cie*.

Hereby enters this disclaimer to claims 2 and 4 of said Letters Patent.
[*Official Gazette October 24, 1939.*]